United States Patent [19]

Nagel

[11] 3,875,329

[45] Apr. 1, 1975

[54] FRAME GRABBING SYSTEM

[75] Inventor: Robert H. Nagel, New York, N.Y.

[73] Assignee: IDR, Inc., New York, N.Y.

[22] Filed: Jan. 17, 1974

[21] Appl. No.: 434,241

[52] U.S. Cl....... 178/6.8, 178/DIG. 22, 178/DIG. 24

[51] Int. Cl............................................... H04n 7/18

[58] Field of Search............... 178/5.6 R, 5.8 R, 6.8, 178/DIG. 22, DIG. 24

[56] References Cited

UNITED STATES PATENTS

| | | | |
|---|---|---|---|
| 3,569,617 | 3/1971 | Allen | 178/6.8 |
| 3,586,767 | 6/1971 | Morchand | 178/5.6 |
| 3,810,174 | 5/1974 | Heard | 178/DIG. 22 |

*Primary Examiner*—Howard W. Britton
*Attorney, Agent, or Firm*—Hubbell, Cohen & Stiefel

[57] ABSTRACT

A real time frame grabbing system for substantially instantaneously providing a continuous video display of a selectable predetermined video display of information and a video display means from a plurality of different continuously transmitted frames of video information. The selected frame which is grabbed in real may be continuously updated in real time. The selected frame is located by counting of the vertical sync pulses, the counter being reset in accordance with detection of a frame sync pulse on a predetermined horizontal scan line of a frame, the interval between these reset pulses being dependent on a predetermined minimum update time and maximum access time for a frame. The updating of a frame is provided in accordance with the detection of another pulse located on a different horizontal scan line and used for the frame sync pulse when the frame contains updated video information. Capture logic is responsive to detection of these signals either indirecely or directly in order to control a local memory which captures the frame for continuous video display thereof until either a new frame is selected or the selected frame is updated, the capture video information changing in either instance.

16 Claims, 9 Drawing Figures

FRAME GRABBING SYSTEM

BACKGROUND OF THE INVENTION

1. Field of the Invention

The present invention relates to video communication systems in which individual frames may be grabbed for video display thereof.

2. Description of the Prior Art

Video communication systems in which individual frames may be grabbed for video display are well known, such as the system disclosed in U.S. Pat. No. 3,740,465, or a system employing the Hitachi frame grabbing disc Model No. VDM 100H. These prior art systems such as the one disclosed in U.S. Pat. No. 3,746,780 are normally two-way request response systems requiring the user to request information by the dialing of a specific digital code which is uniquely assigned to each frame. Such prior art systems do not provide for real time updating of the grabbed video frame. Furthermore, some such prior art frame grabbing systems, such as the type disclosed in U.S. Pat. No. 3,397,283 are normally capable of only grabbing the next immediate signal in response to the provision of a starter signal or, as disclosed in U.S. Pat. No. 3,051,777, utilize a counter for frame location which must be reset to the beginning of a tape for video tape supplied information in order to locate a selected frame to be grabbed. These systems are not applicable in a real time frame grabbing environment. Similarly, other typical prior art frame grabbing systems, such as disclosed in U.S. Pat. Nos. 3,695,565; 2,955,197; 3,509,274; 3,511,929 and 3,582,651 can not be utilized in a real time frame grabbing environment, such as one in which the video information associated with the grabbed frame is capable of being continuously updated. Accordingly, presently available prior art frame grabbing systems familiar to the Inventor are not capable of easily locating a frame to be grabbed in real time nor of being able to continuously update such a grabbed frame in real time.

These disadvantages of the prior art are overcome by the present invention.

SUMMARY OF THE INVENTION

A real time frame grabbing system for substantially instantaneously providing a continuous video display of a selectable predetermined video display of information and a video display means from a plurality of different continuously transmitted frames of video information is provided. The selected frame which is grabbed in real time may be continuously updated in real time. The selection frame is located by counting of the vertical sync pulses, the counter being reset in accordance with detection of a frame sync pulse on a predetermined horizontal scan line of a frame, the interval between these reset pulses being dependent on a predetermined minimum update time and maximum access time for a frame. The updating of a frame is provided in accordance with the detection of another pulse located on a different horizontal scan line and used for the frame sync pulse when the frame contains updated video information. Capture logic is responsive to detection of these signals either indirectly or directly in order to control a local memory which captures the frame for continuous video display thereof until either a new frame is selected or the selected frame is updated, the capture video information changing in either instance.

The coding of the predetermined horizontal scan lines with the frame sync information and update control signals is provided in conventional fashion by a conventionally programmed computer which retrievably stores the continuously transmitted video frames in a mass memory. This stored information is supplied to a video generator which creates a frame of video information at a predetermined rate from data contained in the mass memory. The resulting signal can modulate RF and can be transmitted any way suitable for standard television transmission. This signal is subsequently retrieved by logic that compares the actual frame number with the frame number requested, such as by keyboard, and if they agree, captures and stores this information in the local memory for continuous readout and display. The incoming video signal provides the vertical and horizontal sync information as well as being available for storage on command from capture logic. The provision of a capture command to the local memory causes the frame to be stored which is then continuously read out, such as into a sync adder, and therefrom to the video display means. Thus, a single frame of video information may be instantabeously selected in real time from continuously transmitted video information and such selected frame may be automatically updated as new information is provided in real time.

DETAILED DESCRIPTION OF THE PREFERRED EMBODIMENT

Figure 1:
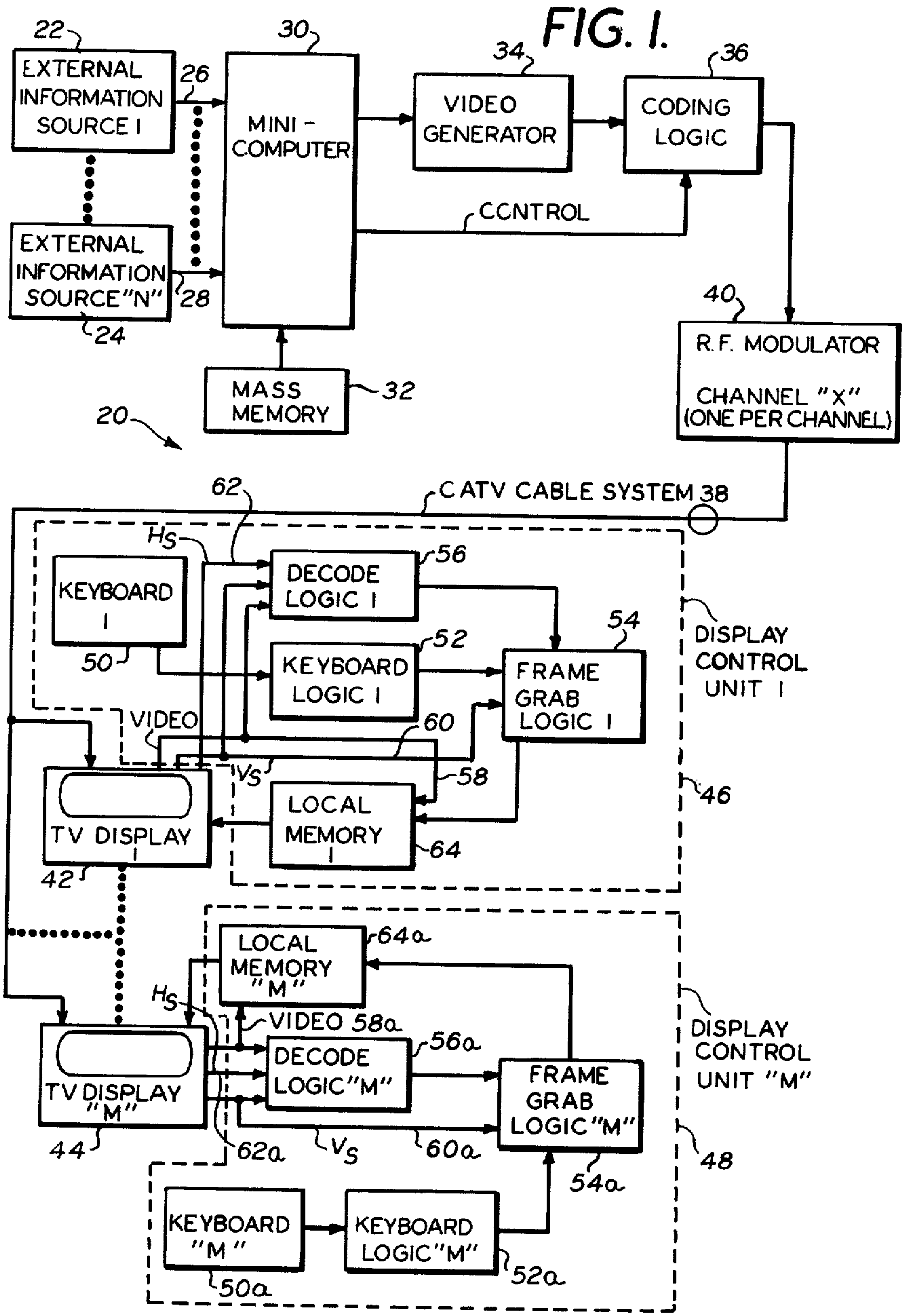
FIG. 1 is a functional block diagram of the preferred embodiment of the frame grabbing system of the present invention.

Referring now to the drawings in detail, and initially to FIG. 1 thereof, the preferred embodiment of the frame grabbing system, generally referred to by the reference numeral 20, of the present invention is shown. As will be described in greater detail hereinafter, the frame grabbing system 20 of the present invention is preferably a one-way frame grabbing system in which continuously transmitted information or messages may be instantaneously "grabbed" in real time so as to repetitively provide a video display of a selected video frame of such information which may be updated in real time. This video information may be of any conventional type, such as news information, money rate information, stock market information, local advertising, television program listings, weather information, consumer information, etc., which is conventionally supplied from conventional external information sources for these types of information such as sources 22 and 24 shown by way of example. These conventional external information sources 22 and 24 preferably conventionally supply this information in a digital format, such as from a ticker for news information or stock information, by way of example, through a conventional communication line 26 or 28 or a conventional local video terminal, preferably to a conventional minicomputer 30, such as a model number PDP-8e manufacturerd by Digital Equipment Corp. Minicomputer 30 preferably has an associated conventional mass memory disc 32 for conventional storage of data. Computer 30 conventionally formats the incoming data or information to be continuously supplied, such as by adding header information such as line and page information, and packing the characters, and stores this formatted data in the mass memory 32 for subsequent transmission in a manner to be described in greater detail hereinafter. The output of computer 30 is supplied to a conventional video generator 34, such as a VT 8*e* manufactured by Digital Equipment Corp., which has been modified in conventional fashion to insure the proper initiation of the initial horizontal sync pulse and move the initial character margins for any subsequent video display of the incoming information and allow the coding logic to be coded to the video signal. The computer 30 also provides control information to coding logic 36 which will be described in greater detail hereinafter with reference to FIG. 3. As will be described in greater detail hereinafter, the coding logic 36 is supplied with vertical sync and horizontal sync signals from video generator 34. The mass memory 32 is updated by the computer 30 in conventional fashion at the optimum transfer time for data which is, conventionally, not necessarily in the order of reception of the external information from sources 22 and 24, this data being preferably continuously suppliable in real time to the computer 30. Preferably, the primary task of the computer 30 is to read the previously stored data in the mass memory 32 and, through control of the video generator 34 and the coding logic 36, transmit this information for video display, such as to a conventional CATV cable system 38. In conventional fashion, the information being supplied to the CATV cable system 38 from computer 30 is input to the system through a conventional RF modulator 40, one such modulator 40 preferably being provided for each television channel on which information is to be transmitted.

The mass memory 32 which is read in conventional fashion by computer 30 to provide the requisite information, together with video generator 34 and coding logic 36, to the CATV cable system 38 preferably has sufficient storage capacity to store the entire page capacity of the system. As used hereinafter throughout the specification and claims the term page means one video frame of information and the term line means one row of information in a page. However, the term scan line is used in its conventional manner. The mass memory 32 may be any conventional mass memory storage device sufficient to store the requisite page capacity of the system, such as an RK-08 memory device manufactured by Digital Equipment Corp., which is capable of storing, by way of example, 1.2 million words or approximately 8,000 thirty-two character-by-twelve line pages (two characters per word). Such a mass memory 32, given by way of example, could be utilized if this is the desired page capacity of the system 20. The output of computer 30, which is preferably properly formatted digital information provided from the incoming external information sources 22 and 24, by way of example, is preferably conventionally databreak (Not Shown) of the computer 30. All pages of information are preferably continuously being transmitted in serial form from computer 30 through video generator 34 and, subsequently, from video generator 34 to the coding logic 36 (which preferably receives control key information from the minicomputer 30), therefrom to the appropriate RF modulator 40 for the video channel being utilized and, therefrom, through the CATV cable system 38 to conventional video display terminals or devices 42 and 44, such as commercially available video monitors or TV receivers, two such devices being shown by way of example. It should be noted that the number of video display devices 42 and 44 preferably has no requisite correlation with the number of external information sources 22 and 24 and more sources 22 and 24 could be utilized than video display devices 42 and 44 or vice versa, if desired. In normal contemplated use, the number of video display devices 42 and 44 will normally exceed the number of external information sources 22 and 24, however, this need not be the case.

The computer 30 conventionally recirculates the data provided thereto in continuous fashion and, as previously mentioned, eventually updates the mass memory 32 at the optimum transfer time for the data, which time is not necessarily in the order of reception of the external information from sources 22 and 24. The information from external sources 22 and 24, which is preferably being provided substantially continuously to the computer 30 (as long as it is being generated from the external sources 22 and 24) is provided to the mass memory 32 and instantaneously to the video generator 34. Video generator 34 operates in conventional fashion to create a standard television raster containing a video translation of the digital characters being provided from the computer 30 utilizing the page and line header information being supplied by the computer 30. If desired, the video generator 34 may add a page number and time of day information to the page video display. As previously mentioned, the video generator 34, is preferably of the conventional type such as a model VT 8*e* manufactured by Digital Equipment Corp., which has been modified in conventional fashion as well as to allow the addition of a new frame indication signal and a frame sync information signal to the normal video output, as will be described in greater detail hereinafter.

As will also be described in greater detail hereinafter, each video display device 42 and 44 preferably has an associated display control 46 and 48, respectively, which, as will be described in greater detail hereinafter, preferably functions to enable the real time frame grabbing or selection of a single page of continuously transmitted information for the instantaneous repetitive continuous video display, or frame grabbing, thereof, this information being updateable in real time. Preferably, each of the display control units 46 and 48, by way of example, one such display control unit preferably being associated with each video display terminal or device, are identical in structure and operation. If desired, however, any display control unit 46–48 may be modified in conventional fashion so as to prevent the reception of certain categories of information while enabling the reception of other categories of information such as by utilizing a conventional arrangement of the types used in a conventional subscription communication television system. For purposes of clarity, only one such typical display control unit 46 will be described by way of example, the structure and operation, as previously mentioned, being identical with that of display control unit 48. Identical reference numerals, followed by the letter *a* will be utilized in FIG. 1 for elements of display control unit 48 which are identical in structure and operation with those of display control unit 46.

The display control unit 46 preferably includes a keyboard 50, having conventional keyboard switches such as Model No. 82443601-17 manufactured by Grayhill, for selecting the desired page or video frame of information to be grabbed or repetitively displayed on the video display terminal 42. The keyboard input is provided to keyboard logic 52 which will be described in greater detail hereinafter with reference to FIGS. 2 and 8, which interprets the keyboard input and enables the selection of the appropriate page or frame to be grabbed. The output of the keyboard logic 52 is supplied to frame grab logic 54, which will be described in greater detail hereinafter with reference to FIGS. 2, 5 and 6, which together with the input provided from the keyboard logic 52 enables the capturing or grabbing of the appropriate selected frame as well as the updating of the frame being grabbed in real time, as will be described in greater detail hereinafter. The frame grab logic 54 also receives an input from decode logic 56, which will be described in greater detail hereinafter with reference to FIGS. 2, 4, 6 and 7, which receives the information being supplied through the CATV cable system 38 to the video display device 42 to provide video information, vertical sync and horizontal sync information via paths 58, 60 and 62, respectively. The decode logic 56, as will be described in greater detail hereinafter with reference to FIGS. 2, 4, 6 and 7, receives this information and determines whether the selected or grabbed frame or page is being updated or a new frame or page has been selected or requested. The video information which is being supplied to the decode logic 56 is also preferably supplied to a local memory 64, which will be described in greater detail hereinafter with reference to FIGS. 2 and 6, such as a conventional Hughes storage tube, solid state memory, or a disc of the type manufactured by Hitachi, such as Hitachi Model No. VDM 100H which operates in conventional fashion to provide a frame grabbed video display. Control information for the local memory frame grabbing logic (not shown) is provided to the local memory 64 from the frame grab logic 54 which enables the grabbing of the proper page or frame which has been selected as well as the real time updating of this grabbed frame, as will be described in greater detail hereinafter. As is also shown in FIG. 1, the vertical sync signal via path 60 is supplied to the frame garab logic 54 as well as to the decode logic 56.

Coding Logic

Figure 3:
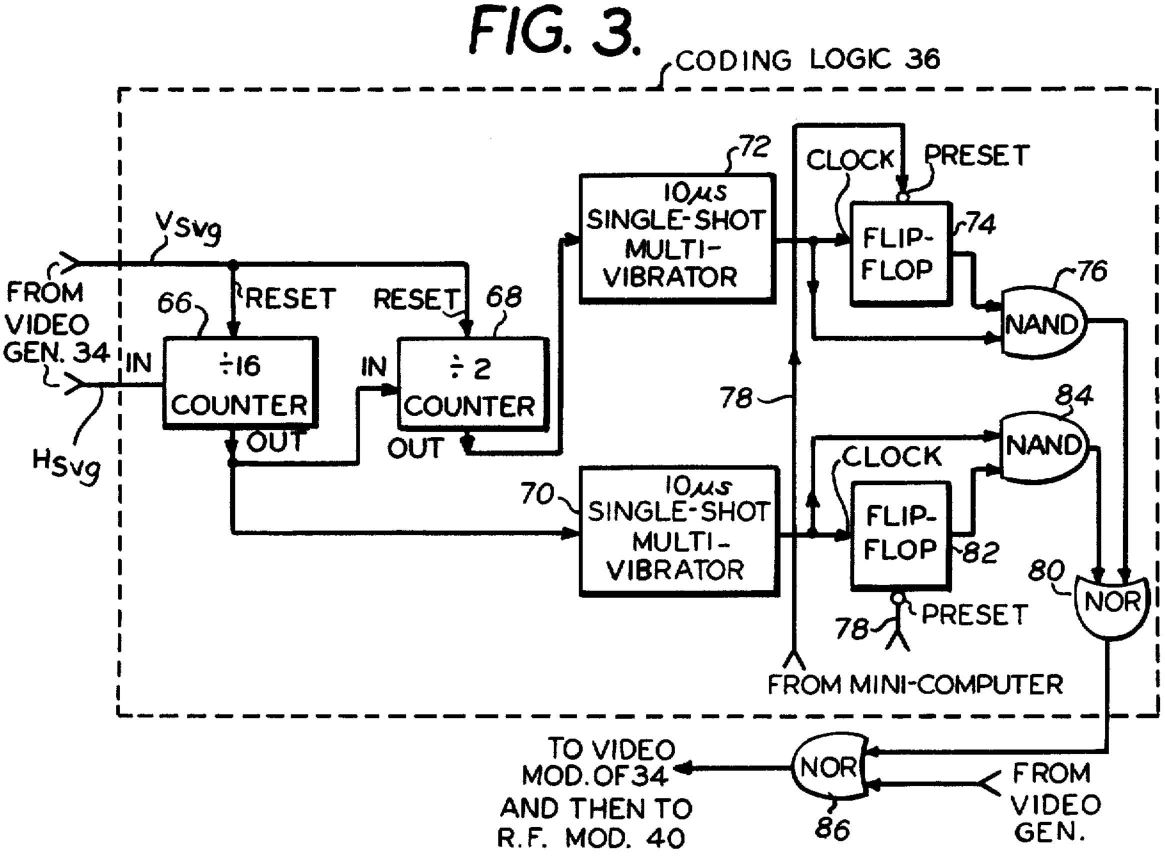
FIG. 3 is a block diagram of the coding logic portion of the system illustrated in FIG. 1.

Referring now to FIG. 3, the coding logic 36 which generates the new frame and frame sync information shall be described in greater detail. As shown and preferred in FIG. 3, the coding logic 36 preferably includes a conventional divide-by-16 counter 66 and a conventional divide-by-two counter 68 although, if desired, a single counter could be utilized to accomplish the same result that will be described in greater detail hereinafter, as well as any other functionally equivalent arrangement of counters. For purposes of explanation, counters 66 and 68 each have a conventional reset, input, and output terminal. The reset terminals of counters 66 and 68 are connected in parallel to the vertical sync output provided from the video generator 34 which vertical sync output is indicated by the symbol V svg. Counters 66 and 68 preferably count the horizontal sync pulses and, accordingly, the horizontal sync output of video generator 34 is provided to the input of counter 66, this sync signal being indicated by the symbol H svg. Both the vertical sync and the horizontal sync outputs of the video generator 34, as previously mentioned, are modified with respect to timing so as to adjust the initial character margins from that normally provided by the conventional VT 8e video generator if that is the device 34 utilized, although, if desired, a video generator 34 constructed in conventional fashion to provide these initial character margins may be utilized in which case no such modification is necessary. The output of the divide-by-16 counter 66 is connected in conventional fashion to the input of the divide-by-two counter 68 and in parallel to the input of a conventional single-shot multivibrator 70, such as one preferably having a predetermined pulse duration, such as, by way of example, a 10 micro-second pulse duration, whose occurrence is triggered by the output from counter 66. Similarly, the output of counter 68 is connected to the input of another conventional single-shot multi-vibrator 72, such as one preferably having an identical pulse duration with that of multi-vibrator 70, which is triggered to provide this pulse by the provision of an output from counter 68. The output of the single shot multi-vibrator 72 is preferably connected in parallel to the clock input of a conventional flip-flop 74 and to one input of a two input NAND gate 76. The other input to NAND gate 76 is connected to the output of flip-flop 74. The present input of flip-flop 74 is preferably connected to the output of computer 30 via control path 78. The output of NAND gate 76 is preferably connected to one input of a conventional NOR gate 80. Similarly, the output of multi-vibrator 70 is connected in parallel to the clock input of another conventional flip-flop 82 and to one input of another conventional two input NAND gate 84. The other input to NAND gate 84 is preferably connected to the output of flip-flop 82. The output of NAND gate 84 is connected to the other input of NOR gate 80. Similarly, the preset terminal of flip-flop 82 is connected via control path 78 to the computer 30. The output of the NOR gate 80 is connected to one input of another conventional two input NOR gate 86 whose other input is connected to the output of video generator 34 to receive normal video control character display information. The output of NOR gate 86 is provided to the video modulator portion (not shown) of video generator 34 and is processed in conventional fashion and then provided to the appropriate conventional RF modulator 40 which conventionally modulates the appropriate RF carrier with the video information provided from the video modulator portion of video generator 34.

The operation of the coding logic 36 is as follows. Counter 66 counts the horizontal sync pulses provided from the video generator 34 and preferably provides an output such as a burst of video energy, on the 16th horizontal scan line following the vertical sync pulse. Similarly, an output, such as another burst of video energy is preferably provided from counter 68 on the 17th horizontal scan line following the vertical sync pulse. The provision of an output from counter 66 triggers single-shot 70 which in turn then provides one of the inputs to NAND gate 84, which input is, by way of example, high for the duration of the single-shot pulse, as well as providing the clock input to flip-flop 82. If computer 30 has supplied a preset pulse to flip-flop 82 any time before the occurrence of the leading edge of the output single-shot pulse from multi-vibrator 70, then flip-flop 82 will supply an output to NAND gate 84. When NAND gate 84 receives both of these outputs, it provides an output to NOR gate 80. When this output is received by NOR gate 80, an output is provided to NOR gate 86, and, therefrom, to the video modulator of video generator 34, then to the RF modulator 40 and, therefrom, to the CATV cable system 38. As was previously mentioned, the output of counter 66 is also supplied to the input of counter 68 to enable it to count to 17, counters 66 and 68, if desired, comprising a divide-by-17 counter with counter 68 representing the last stage thereof. On the occurrence of the 17 horizontal scan line following the vertical sync, counter 68 preferably provides an output to multi-vibrator 72 which triggers the multi-vibrator 72 to provide a single-shot pulse of predetermined duration, such as 10, is by way of example. This single-shot pulse output of multi-vibrator 72 is provided as one of the inputs to NAND gate 76 which is, by way of example, high for the duration of the single-shot pulse and, as was previously mentioned, this pulse is also provided to the clock input of flip-flop 74. As in the case of flip-flop 82, if the computer 30 has supplied a preset pulse to flip-flop 74 via path 78 any time before the occurrence of the leading edge of the single-shot pulse output from multi-vibrator 72, then flip-flop 74 will provide an output to NAND gate 76. When NAND gate 76 receives both outputs, it will provide an output to NOR gate 80 which will, in turn, provide an output to NOR gate 86 and, therefrom, to the video modulator of video generator 34, then to the RF modulator 40 and, therefrom, to the CATV cable system 38. If the computer 30 has not provided a preset pulse to flip-flop 82 or flip-flop 74 prior to the occurrence of the leading edge of the single-shot pulse output of multi-vibrator 70 or 72, respectively, then flip-flop 82 or flip-flop 74, respectively, will not provide an output until the occurrence of a video fram in which the computer 30 has supplied the preset pulse prior to the occurrence of the leading edge of the leading edge of the single-shot pulse output of multi-vibrator 70 or 72, respectively. Computer 30 is preferably programmed in conventional fashion to supply these preset pulses via path 78 in accordance with an appropriate conventional scheduling algorithm which provides these preset pulses at predetermined intervals in accordance with the minimum permissible update time for a frame and the maximum permissible access time for the frame. If desired, as will be explained in greater detail hereinafter, if different categories of information are provided from external sources 42 and 44, these information categories may have different associated access times and/or update times in which instance the computer 30 conventional scheduling algorithm would preferably determine the position of the preset pulses in accordance with the minimum permissible update time and maximum permissible access time for a frame based, in addition, on predetermined priorities assigned to the various categories of information.

Display Control Unit

Figure 2:
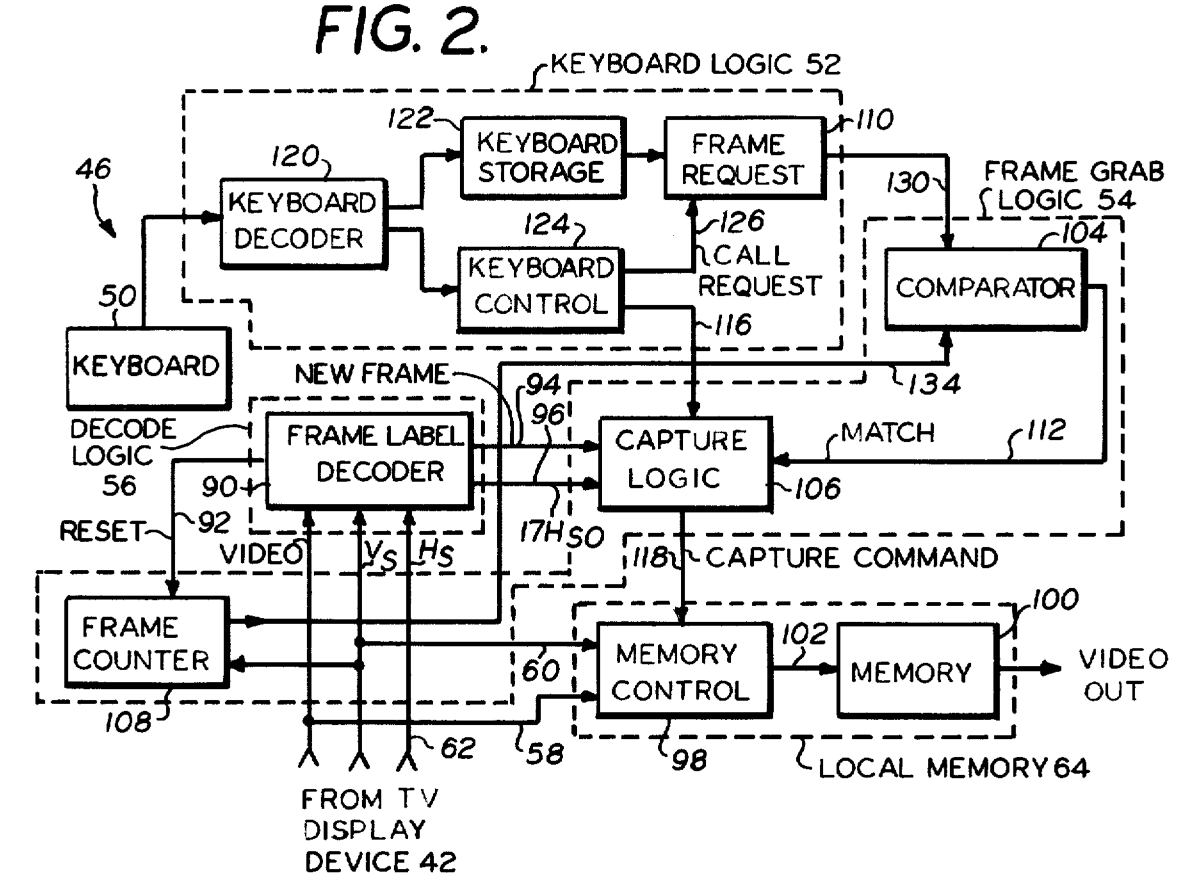
FIG. 2 is a functional block diagram of a typical display control unit portion of the system shown in FIG. 1.

Referring now initially to FIG. 2, a typical display control unit 46 will be described in greater detail hereinafter, display control unit 48 preferably being identical in structure and function with that of display control unit 46 being hereinafter described by way of example. The input signal provided via the CATV cable system 38 to the video display terminal 42 is processed in conventional fashion to demodulate the signal and separate the vertical and horizontal sync signals. If desired, this demodulation and sync separation could be accomplished by a conventional demodulator and sync separator external to the video display terminal 42 as opposed to utilizing the conventional circuitry contained within the video display terminal 42 for accomplishing this. This demodulated video signal is supplied via path 58, as was previously mentioned, to the local memory 64 and to the decode logic 56. Specifically, the decode logic 56 preferably comprises a frame label decoder 90 to be described in greater detail hereinafter with reference to FIGS. 4, 6 and 7, which receives as an input thereto the demodulated video signal and the vertical and horizontal sync signals from the video display device 42 and provides as an output, as will be described in greater detail hereinafter, a frame sync or reset signal via path 92 to the frame grab logic 54 as well as a new frame signal via path 94 to frame grab logic 54 indicating that the selected frame which has previously been captured or grabbed contains new information or, in other words, has been updated. In addition, a timing signal, $17H_{no}$ is provided via path 96 to the frame grab logic 54 as an indication that all logic associated with the captive or grab decision has been predetermined, this signal preferably always being provided when the trailing edge of the 17 th horizontal scan line is sensed irrespective of whether new frame information is provided, all the logic associated with the frame grabbing preferably having been predetermined by the time the 17th horizontal scan line has been provided. The local memory 64 preferably contains a memory control portion 98, which will be described in greater detail hereinafter with reference to FIG. 6, and a memory portion 100, such as a conventional Hitachi disc or video storage tube with its associated conventional local memory frame grab logic (Not Shown), the memory control 98 providing a signal to the memory 100 via path 102.

The frame grab logic 54, as shown and preferred, contains a conventional logic comparator 104 shown in greater detail in FIG. 6, a capture logic portion 106 which will be described in greater detail hereinafter with reference to FIG. 5 and 6, and a frame counter portion 108, which will be described in greater detail hereinafter with reference to FIG. 6. The comparator 104, as will be described in greater detail hereinafter, is operatively connected to the output of the frame counter 108 to receive one input therefrom and to the keyboard logic 52 to receive another input therefrom. Specifically, the keyboard logic 52 contains a frame request register 110, to be described in greater detail hereinafter with reference to FIGS. 8 and 9, whose output is provided to the input of the comparator 104. When a match occurs between the information provided from the frame counter 108 and the information provider from the same request register 110, the comparator 104 provides an output signal via path 112 (labeled match) as one input to the capture logic 106. Similarly, the capture logic 106 receives a new frame or update signal input from the frame label decoder 90 via path 94, a timing or logic predetermined signal (17H$_{so}$) from frame label decoder 90 via path 96, and control key information from the keyboard logic 52 via path 116. As will be described in greater detail hereinafter, under the approriate conditions, the capture logic 106 provides a capture command signal via path 118 to the memory control 98 which also receives the demodulated video information and the vertical sync information from the video display device 42.

The keyboard logic 52, as shown and preferred, comprises a keyboard decoder 120, which will be described in greater detail hereinafter with reference to FIG. 8, a keyboard storage portion 122 and a keyboard control portion 124 in addition to the frame request register 110, the keyboard storage portions and keyboard control portions 122 and 124, respectively, also being described in greater detail hereinafter with reference to FIGS. 8 and 9. The output of the keyboard 50 is preferably connected to the input of the keyboard decoder 120 which preferably provides an output to both the keyboard storage portion 122 and the keyboard control portion 124. The output of the keyboard storage portion 122 is preferably connected to one input of the frame request register 110. In addition, the keyboard control portion 124 preferably provides call request information to the frame request register 110 via path 126 and control key information to the capture logic 106 via path 116.

The operation of the display control unit 46 illustrated in FIG. 2 in selecting a particular frame to be grabbed for repetitive or continuous video display is preferably as follows. The frame identification number or page number is inserted in the keyboard 50 in conventional fashion and is provided therefrom as a digital signal to the keyboard decoder 120. Keyboard decoder 120 decodes this digital signal into control information, such as CALL, MORE, or BACK control signals, and address information. The control information is routed to the keyboard control portion 124 and the address information is routed to the keyboard storage 122, which is preferably a shift register for temporary storage. The information stored in keyboard storage shift register 122 is preferably loaded into frame request register 110 only when the keyboard control portion 124 detects a call command, which is a request for the instantaneous selection of a particular frame, this call request signal being transmitted via path 126 to the frame request register 110. The keyboard control 122 also preferably increments or decrements the frame request register 110 via path 126 when a MORE or BACK control signal or command, indicating up or down, respectively, is detected. As will be described in greater detail hereinafter the keyboard storage register 122 and the frame request register 110 are preferably three digit registers.

The output of the frame request register 110 is preferably constantly being supplied to the comparator 104 via path 130 which is also receiving an input from the frame counter 108. The comparator 104 preferably constantly compares the output of the frame counter 108 with the output of the frame request register 110. When these output signals match, the comparator 104 provides an output signal to the capture logic 106 which, as was previously mentioned, also receives a control key signal via path 116 from the keyboard control portion 124. If the input provided to the capture logic 106 from the comparator 104 via path 112 is the first input from the comparator 104 received by the capture logic 106 after a control key signal input has been provided via path 116 to the capture logic 106 from the keyboard control portion 124, then the capture logic 106 interprets this condition as the first frame to capture and the capture logic 106 produces a capture command output via path 118 to the memory control 98 in sync with the vertical sync pulse being provided to the memory control 98, the frame counter 108, and the frame label decoder 90. Subsequent outputs from the comparator 104 are then ignored by the capture logic 106 until an output from frame label decoder 90 indicates that the frame contains new information via path 94, or an output from keyboard control 124 via path 116 indicates that a new frame has been requested. The capture command signal provided to the memory control 98 via path 118 preferably operates in conventional fashion to gate the video frame information into the memory portion 100 for conventional provision of the frame grabbed video display. An output from the frame label decoder 90 to the capture logic 106 via path 94 preferably occurs when energy is found in the video signal during the occurrence of the sixteenth horizontal scan line of the frame, such an output being provided via path 94. As previously mentioned, at the end of the seventeenth horizontal scan line the 17H$_{so}$ signal is provided. In addition, if energy is found on the seventeenth horizontal scan line of a frame, an output is preferably produced from the frame label decoder 90 to the frame counter 108 via path 92 which resets the frame counter 108 which is supplying input information to the comparator 104 via path 134. This output pulse is a reset pulse or frame sync pulse, as previously described. The frame counter 108 is preferably incremented by one on every vertical sync pulse following the occurrence of the reset output from the frame label decoder 90 provided via path 92 to the frame counter 108.

Frame Label Decoder

Figure 4:
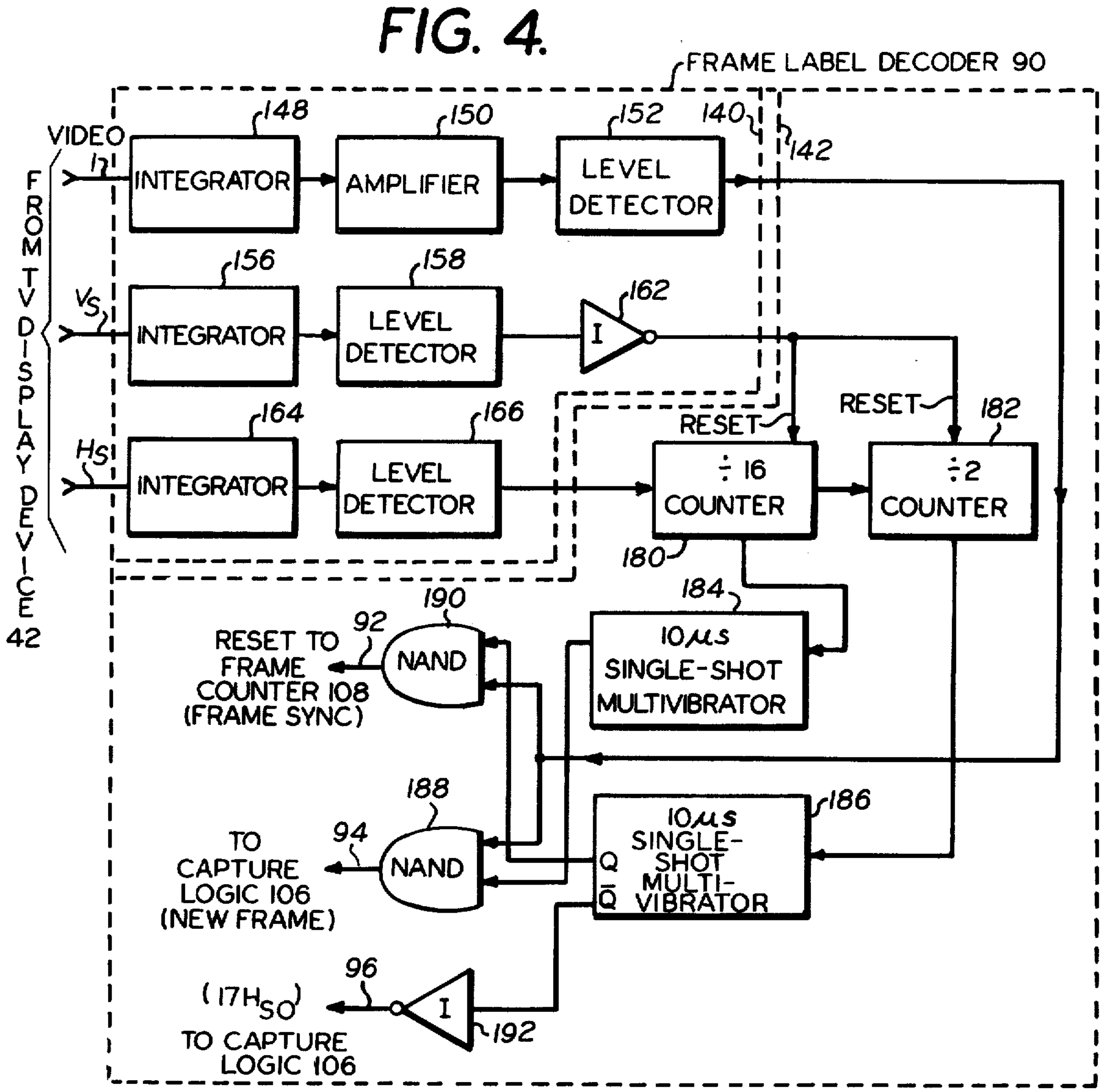
FIG. 4 is a detailed block diagram of the frame label decoder logic portion of the type illustrated in FIG. 2.
Figure 6:
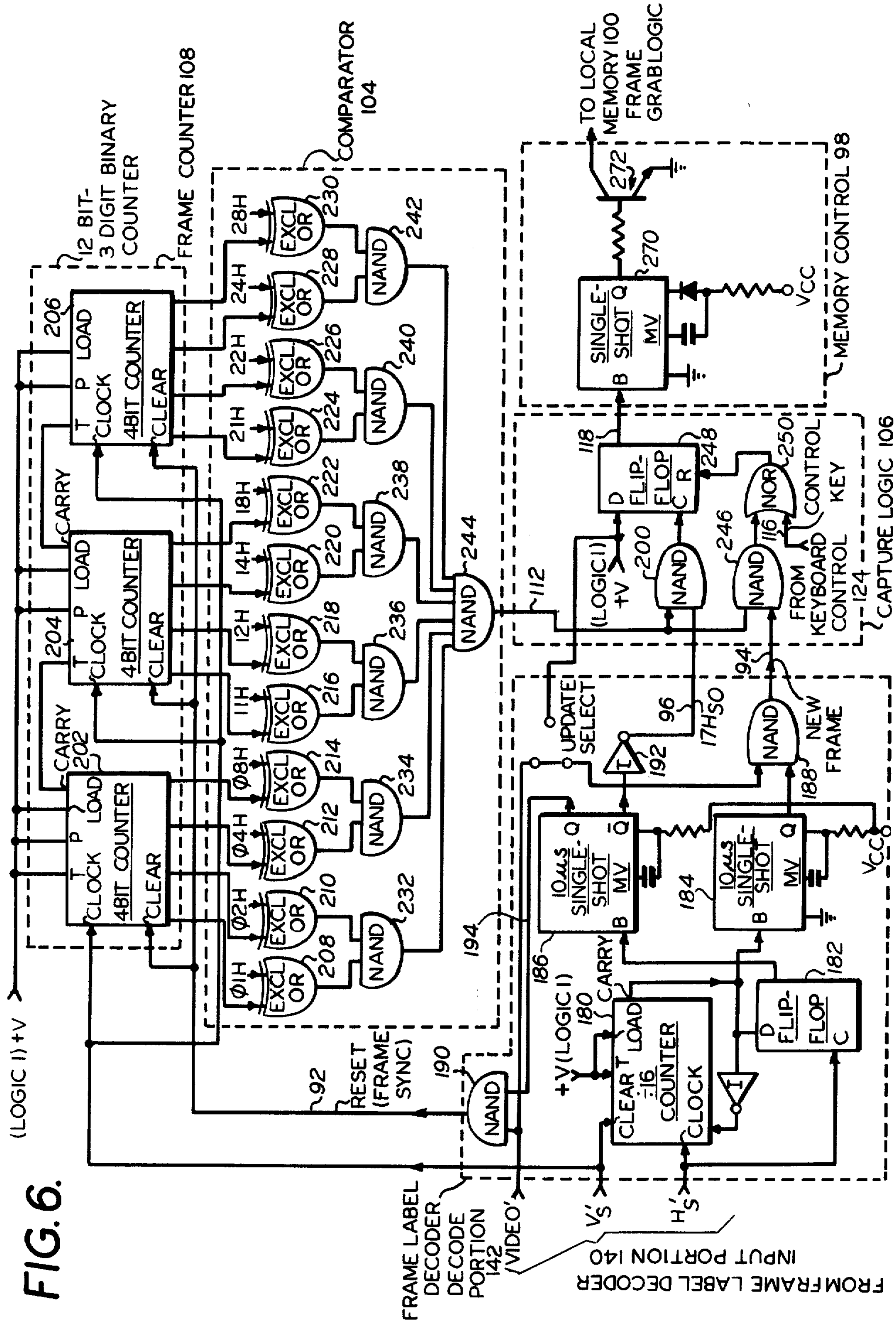
FIG. 6 is a logic block diagram, partially in schematic, of the frame label decoder-capture logic-comparator-frame counter-memory control portion of the system illustrated in FIG. 2.
Figure 7:
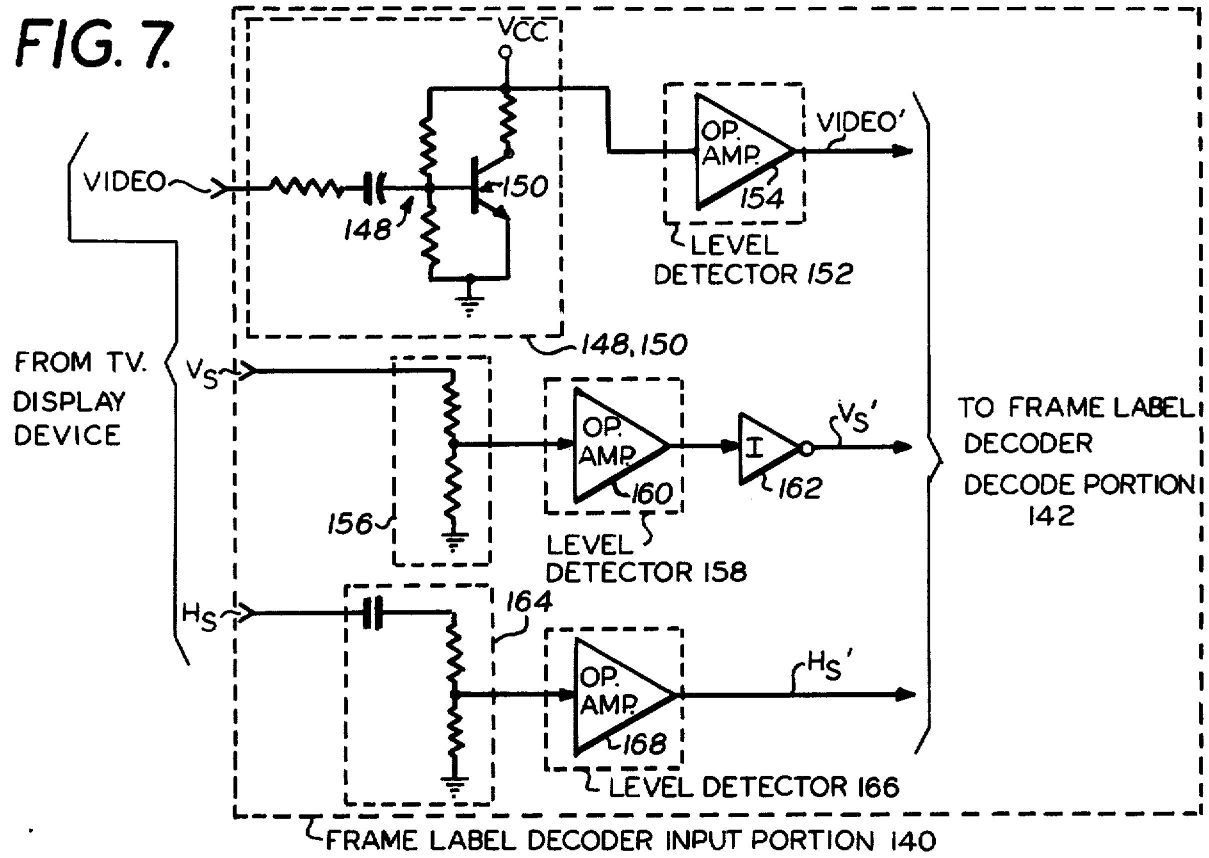
FIG. 7 is a logic diagram, partially in schematic of the frame label decoder input portion of the frame label decoder illustrated in FIG. 2.

Referring now to FIGS. 4, 6 and 7, the preferred frame label decoder 90 will be described in greater detail hereinafter. The frame label decoder 90 preferably includes an input portion 140 (FIG. 7) and a decode portion 142 (FIG. 6). The frame label decoder 90 input portion 140 preferably comprises a conventional integrator 148, illustrated in greater detail in FIG. 7, which receives the demodulated video information and conventionally integrates the signal, a conventional amplifier 150, such as a transistor amplifier illustrated in FIG. 7, and a conventional level detector 152, such as a conventional operational amplifier 154 connected in conventional fashion to function as a level detector.

The integrator 148 receives the demodulated video signal output from the video display device 42, integrates this signal and provides the integrated signal as an input to the amplifier 150 whose output is provided to the input of the level detector 152 which, in turn, provides a processed video signal output (VIDEO') to the decode portion 142 of the frame label decoder 90. Similarly, the vertical sync output provided from the video display device 42 is preferably provided to another conventional integrator 156, shown in greater detail in FIG. 7, whose output is provided to another conventional level detector 158 which, as shown and rpreferred in FIG. 7, preferably comprises a conventional operational amplifier 160 connected in conventional fashion to function as a level detector, whose output is preferably provided through a conventional inverter 162 for the logic chosen by way of example although, if unnecessary for the selected logic, the inverter 162 may be omitted, to provide a processed video sync signal ($V_s'$) to the decode portion 142 of the frame label decoder 90. Lastly, the horizontal sync output of the video display device 42 is preferably provided to another conventional integrator 164 shown in greater detail in FIG. 7 whose output, is in turn, provided to another conventional level detector 166, such as a conventional operational amplifier 168 connected in conventional fashion to function as a level detector. The output of the level detector 166 which is a processed horizontal sync signal ($H_s'$) is provided to the decode portion 142 of the frame label decoder 90 which functions in the manner to be described in greater detail hereinafter, along with the processed vertical sync signal and processed video information signal described above. Since the integrators and level detectors 148, 150, 152, 154, 156, 158, 160, 162, 164, 166, and 168 are conventional in structure and operation, they will not be described in any greater detail hereinafter as they will readily be understood by one of ordinary skill in the art. It should be noted that preferably, level detectors 152, 158 and 166 are Schmitt triggers which have been utilized as level detectors, and, by way of example, the configuration of the integrator 148 and amplifier 150 for the video signal provides integration, amplification and impedance isolation for the video signal line.

As shown and preferred in FIGS. 4 and 6, the frame label decoder 90 decode portion 142 preferably includes a conventional divide-by-16 counter 180 and a conventional divide-by-two counter 182 whose input is connected to the output of the divide-by-16 counter 180. As shown and preferred in FIG. 6, the divide by two counter 182 preferably comprises a conventional flip-flop. As also shown and preferred in FIG. 4, the processed vertical sync signal Vs is provided to the reset terminal of the counters 180 and 182 to clear these counters 180 and 182 in conventional fashion and the processed horizontal sync signal $H_s$ is preferably provided to the clock input of the counters 180 and 182. The output of counter 180 is supplied as a trigger signal to the input of a conventional single-shot multivibrator 184 preferably having a pulse duration, by way of example, of ten micro-seconds. Similarly, the output of counter 182 is provided as a trigger signal to another conventional single-shot multi-vibrator 186 preferably also having, by way of example, a 10 micro-second pulse-duration. The single-shot pulse output of multivibrator 184 is preferably provided as one input to a two input NAND gate 188 whose other input is the processed video signal provided from the level detector 152 of the frame label decoder 90 input portion 140, which signal is also provided in parallel as one input portion 140, which signal is also provided in parallel as one input of another conventional NAND gate 190. The output of NAND gate 188 is the new frame or update signal provided via path 94 to the capture logic 106. The output of the single-shot multi-vibrator 186 in one state, shown by way of example in FIG. 6 as the Q state is the $17H_{s0}$ signal provided through conventional inverter 192 (for the logic chosen by way of example) via path 96 to capture logic 106, and the output in the other state, shown illustratively in FIG. 6 as the $\overline{Q}$ state, is provided as the other input to NAND gate 190. If the logic chosen does not require the use of inverter 192 it may be omitted. The output of NAND gate 190 is the reset or frame sync pulse provided via path 92 to the frame counter 108. The frame label decoder 90 decode portion 142 is shown in greater detail in FIG. 6 but will not be described in any greater detail hereinafter as the circuitry illustrated therein is conventional and will be readily understood by one of ordinary skill in the art.

The operation of the frame label decoder 90 is as follows. The demodulated video signal from the video display device 42 is preferably supplied to integrator 148 which integrates the total amount of video energy, amplifier 150 providing impedance isolation between the level detector 152 and the input video line. This integrated video signal is provided to the level detector 152 which, when this video signal is above the Schmitt trigger level, causes the Schmitt trigger 152 to conduct. When the video signal is below this conduction level, the Schmitt trigger is preferably off in order to preferably create a high output when the video energy level is above 50 percent of the white level of the television signal to improve the signal-to-noise ratio in a conventional manner. This signal with the improved signal-to-noise ratio is the processed video signal indicated as VIDEO' which provides one input in parallel to NAND gates 188 and 190. The vertical sync output of the video display device 42 is preferably provided to integrator 156 which integrates this signal and provides it to level detector 158 to preferably provide a true logic one vertical sync pulse to the inverter 162 whose output resets counters 180 and 182 in conventional fashion. This inverted true logic one vertical sync signal is the processed vertical sync signal indicated by the symbol $V_s'$ which preferably resets counters 180 and 182 when this processed vertical sync signal is low. The horizontal sync signal from the video display device 42 is provided to integrator 164 which preferably conventionally integrates this signal and provides this integrated signal to level detector 166 which preferably provides a true logic one to the clock input of counter 180 and, in turn, to the clock input of the flip-flop or divide-by-two counter 182. This true logic one is the processed horizontal sync signal represented by the symbol $H_s'$.

Counter 180 preferably counts the horizontal sync signals or horizontal scan lines and produces an output to multi-vibrator 184 to trigger this multi-vibrator on the occurrence of the sixteenth horizontal scan line. Single-shot multi-vibrator 184 provides a single-shot pulse of predetermined duration, such as, by way of example, ten microseconds, at the beginning of the 16th horizontal scan line as one input to NAND gate 188.

Thus, if a video signal is provided from level detector 152 to NAND gate 188, a new frame or update signal will be provided to the capture logic 106 via path 94 during the duration of the single-shot pulse from multi-vibrator 184 indicating the updating of a captured frame to the capture logic 106. On the occurrence of the seventeenth horizontal scan line or pulse the flip-flop or counter 182 will produce an output pulse to multi-vibrator 186 to place the multi-vibrator in the Q state and trigger the multi-vibrator to provide a pulse or predetermined duration such as preferably 10 micro-seconds to NAND gate 190 via path 194 for the duration of the single-shot pulse so that if a video signal is provided from level detector 152 during this interval, an output will be provided from NAND gate 190 which will reset frame counter 108. At the completion of the 17th scan line, multivibrator 186 will change to the $\bar{Q}$ state to provide a signal through inverter 192 to one input of a two input NAND gate 200 of capture logic 106 indicating to the capture logic that the 17th horizontal scan line has occurred and all logic associated with the grabbing of a frame has been predetermined.

As shown and preferred in FIG. 6, the frame counter 108 preferably comprises a 12 bit-three digit binary counter comprising three stages 202, 204 and 206, each stage preferably being a conventional four bit binary counter, one stage being provided per digit. These counters 202, 204 and 206, preferably have their respective load inputs tied to a logic 1 potential. The processed vertical sync signal provided from level detector 158 and inverter 162 is also provided to the clock input of the three stages 202, 204 and 206 of frame counter 108 with the reset signal thereto being provided via path 92 to the clear input of conventional counter stages 202, 204 and 206 of frame counter 108. The various stages 202, 204 and 206 are preferably connected together in conventional fashion to form a conventional twelve bit-three digit binary counter. The output of each of these stages is preferably provided to the conventional digital comparator 104 illustrated in FIG. 6 which comparator comprises a conventional arrangement of EXCLUSIVE OR gates 208, 210, 212, 214, 216, 218, 220, 224, 226, 228 and 230, one gate being provided per bit, and NAND gates 232, 234, 236, 238, 240, 242, and 244 with one NAND gate being provided for each pair of EXCLUSIVE OR gate outputs, these NAND gates being 232 through 242, inclusive, and with NAND gate 244 receiving the outputs of all of NAND gates 232 through 242. One input to each of the EXCLUSIVE OR gates 208 through 230, inclusive, is an associated single bit from the associated counter stage 202 through 206, inclusive and the other input to the two input EXCLUSIVE OR gate is a single bit output of the frame request register (see FIG. 8), which as shown and preferred in FIG. 8, is also a three stage register. As shown and preferred in FIG. 6, EXCLUSIVE OR gates 208 and 210 provide inputs to NAND gate 232, EXCLUSIVE OR gates 212 and 214 provide inputs to NAND gate 234, EXCLUSIVE OR gates 216 and 218 provide inputs to NAND gate 236, EXCLUSIVE OR gates 220, 222 provide inputs to NAND gate 238, EXCLUSIVE OR gates 224 and 226 inputs to NAND gate 240, and EXCLUSIVE OR gates 228 and 230 provide inputs to NAND gate 240, and EXCLUSIVE OR gates 228 and 230 provide inputs to NAND gate 242, the outputs of NAND gates 232 through 242, inclusive, providing inputs to NAND gate 244. Digital comparator 104 functions in conventional fashion to provide an output signal from NAND gate 244 when the outputs from frame request register 110 match the outputs provided from the 12 bit-three digit binary frame counter 108 and this conventional operation will not be described in any greater detail hereinafter.

Capture Logic

Figure 5:
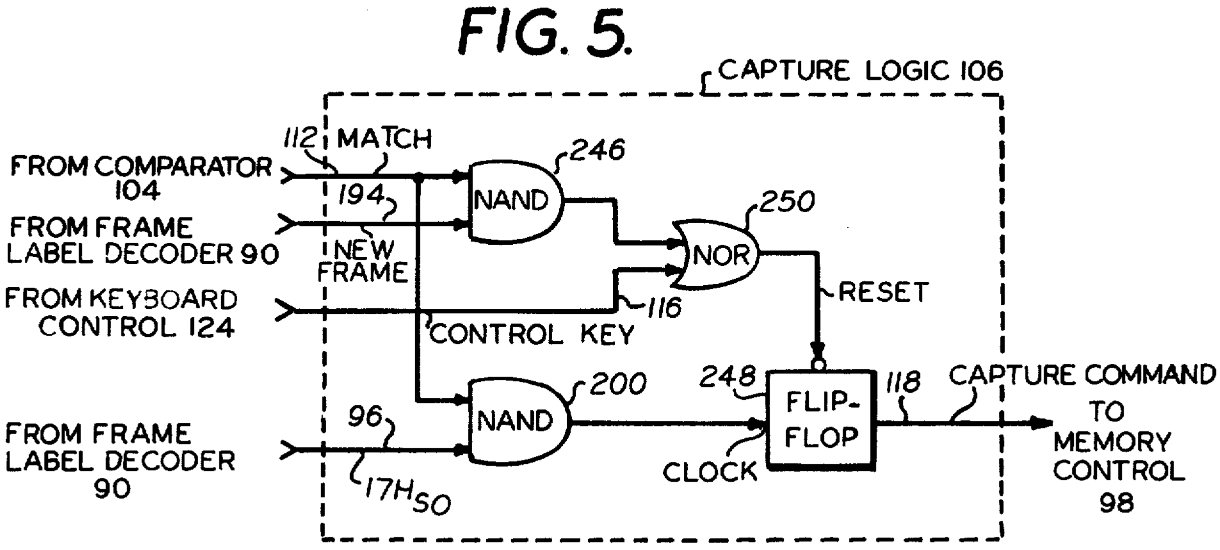
FIG. 5 is a detailed block diagram of the capture logic portion illustrated in FIG. 2.

Referring now to FIGS. 5 and 6, the capture logic 106 preferably comprises NAND gate 246 in addition to NAND gate 200, a conventional flip-flop 248 and a conventional NOR gate 250. The output of NAND gate 244 of comparator 104 is connected in parallel to one input of NAND gates 200 and 246. The other input to NAND gate 200 is the $17H_{80}$ timing signal provided via path 96 in the Q state of single-shot 186 and the other input to NAND gate 246 is the new frame or update signal provided via path 94 from NAND gate 200 is connected to the clock input of flip-flop 248 whose output is the capture command provided via path 118 to memory control 98. The output of NAND gate 246 is provided as one input to NOR gate 250 whose other input is the control key signal provided via path 116 from the keyboard control 124. The output of NOR gate is preferably connected to the reset terminal of the conventional flip-flop 248.

The operation of the capture logic 106 is as follows. When the output from the frame request register 110 matches the output from the three digit binary frame counter 108, a pulse output is provided from NAND gate 244 via path 112 to one input of NAND gates 200 and 246. The new frame or update signal input via path 94 to NAND gate 246 is provided in the manner previously described above. NAND gate 246 provides and output pulse to NOR gate 250 when both input conditions are met; that is, when a match is present and when a new frame or update information is present is indicated by the presence of a new frame signal output via path 94. Thus when NAND gate 246 provides an output to NOR gate 250, NOR gate 250 provides a reset signal to flip-flop 248 to reset flip-flop 248.

When a control key signal is provided from the keyboard control 124 via path 116 to the NOR gate 250, this also causes the provision of a reset pulse to the flip-flop 248 to reset the flip-flop 248. Thus, flip-flop 248 is reset when either a control key is present from the keyboard control 124 or when an output pulse is present from NAND gate 246 upon the simultaneous occurrence of a match and a new frame. When an output signal ($17H_{80}$) is provided in the Q state of single-shot 186 via path 96 to one input of NAND gate 200 at the trailing edge of the 17th horizontal scan line, and a match pulse output is provided to the other input of gate 200 from NAND tate 244 an output pulse is provided from NAND gate 200 to the clock input of flip-flop 248. This preferably occurs at the end of the 17th scan line. When flip-flop 248 sees this clock signal it provides a signal to memory control 98 via path 118, which signal is the capture command, to capture a frame. As shown and preferred in FIG. 6, memory control 98 preferably comprises a conventional single-shot multi-vibrator 270 and a conventional amplifier 272 connected to the output of the signgle-shot multivibrator 270. When the single-shot multi-vibrator 270 is triggered by the occurrence of the capture command on 118, this signal is conventionally amplified by amplifier 272 and provided to the conventional gating circuitry of the local memory 100 frame logic (not shown). Thus, the output signal provided from amplifier 272 controls the gating of the memory 100 from a read to write operation in conventional fashion for one frame following the receipt of the capture signal of capture command from flip-flop 248 via path 118. Memory 100, such as a conventional Hitachi disc then conventionally displays this captured frame until it is updated by new frame information or a difference frame is selected in accordance with the above described operation.

Keyboard Logic

Figure 9:
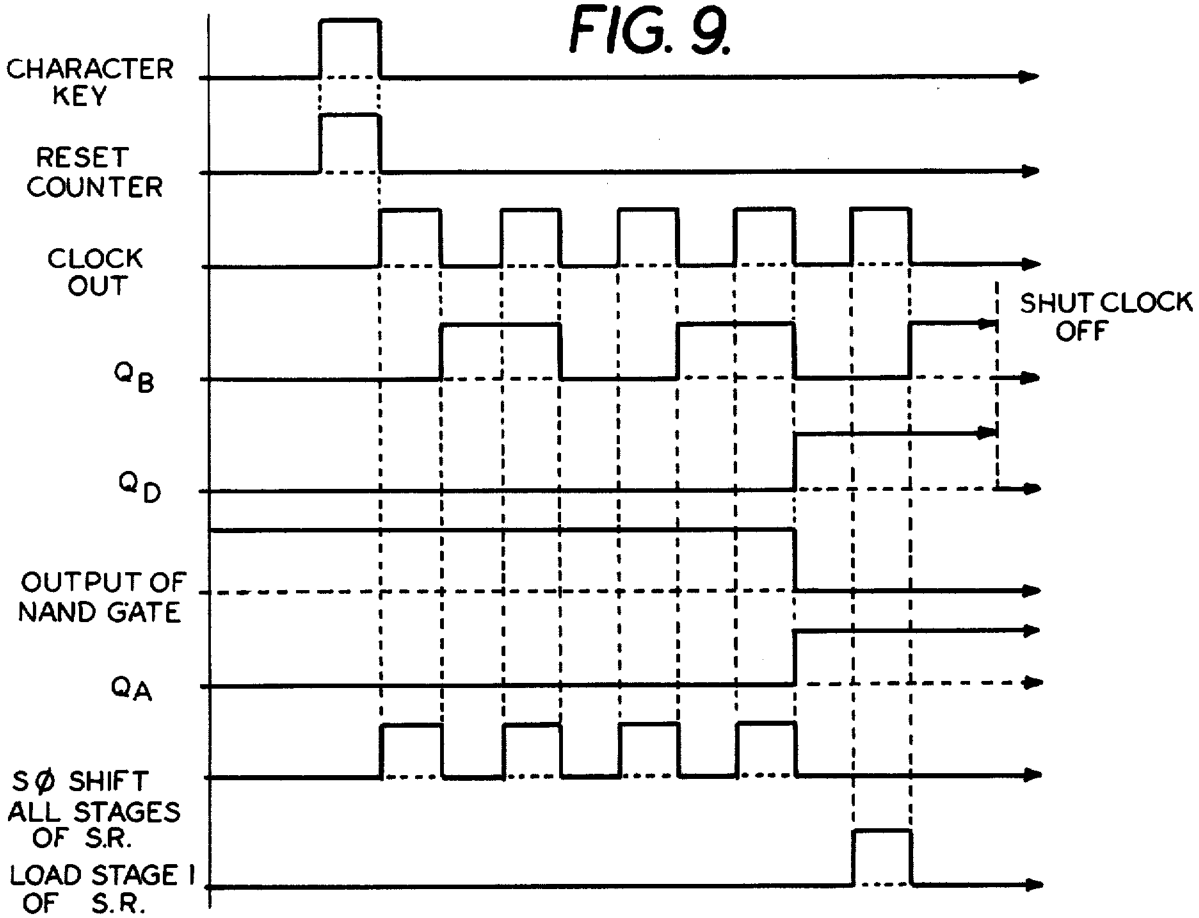
FIG. 9 is a timing diagram illustrative of the operation of the keyboard decoder portion illustrated in FIG. 8.
Figure 8:
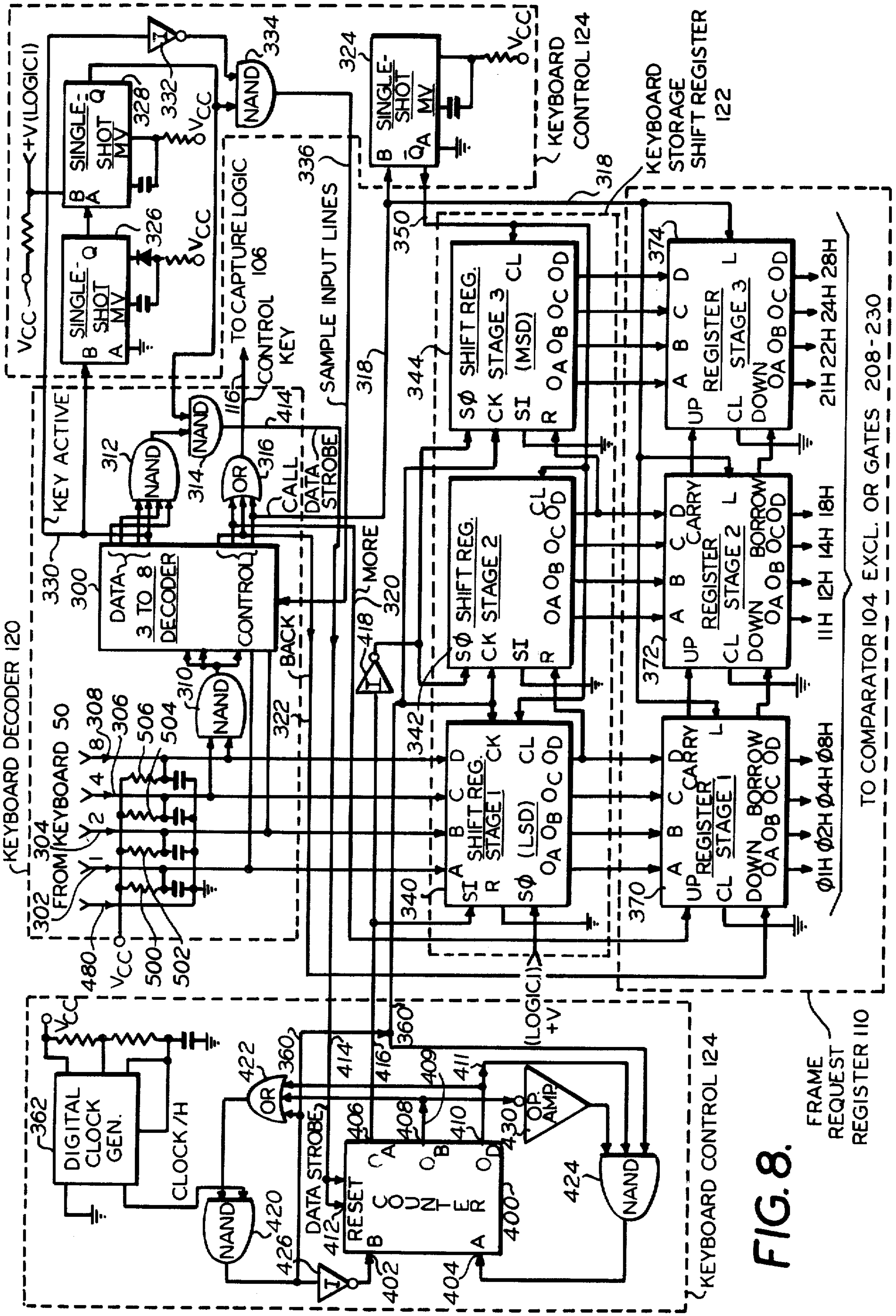
FIG. 8 is a logic block diagram, partically in schematic, of the keyboard logic portion of the system illustrated in FIG. 2.

Referring now to FIGS. 8 and 9, the preferred keyboard logic 52 arrangement of the present invention shall be described in greater detail. Referring initially to FIG. 8, the keyboard decoder 120 preferably includes a conventional 3-to-8 decoder 300 which is operatively connected to the input lines 302, 304, 306 and 308 provided from keyboard 50 four such lines being shown by way of example. Input lines 306 and 308 are connected to the inputs of a two input NAND gate 310 whose output is connected to the input of the decoder 300. Input lines 302 and 304 from keyboard 50 are preferably directly connected to the input to decoder 300 as shown and preferred in FIG. 8. Keyboard decoder 120 also preferably includes NAND fates 312 and 314 and OR gate 316 with a portion (data) of the outputs of decoder 300 being connected to the inputs of NAND gate 312 and the balance of the outputs (control) of decoder 300 being connected to the inputs to OR gate 316. The output of NAND gate 312 is preferably connected to one input of a two input NAND gate 314. As shown and preferred, the output of OR gate 316 is the control key signal provided via path 116 to NOR gate 250 of the capture logic 106. The outputs of decoder 300 provided to OR gate 316 represent the command signals CALL, provided via path 318 which, as previously mentioned, is a request signal requesting the selection of a particular frame to be grabbed for video display, the MORE command signal provided via path 320 which, as will be described in greater detail hereinafter, causes the frame request register 110 to increment by one to select the next successive frame after to the one previously selected, and the BACK command signal provided via path 322 to the frame request register 110 to cause this register 110 to decrement by one so as to select the immediately previous frame to the one previously selected or grabbed. The CALL command signal provided via path 318 is connected in parallel to the load inputs of the frame request register 110 and to a conventional single-shot multivibrator 324 forming a portion of the keyboard control 124.

The keyboard control 124 also preferably includes another pair of conventional single-shot multivibrators 326 and 328 which are connected together in series. One of the output paths 330 from decoder 300 to NAND gate 312, termed the kEY ACTIVE signal is connected in parallel to one input to NAND gate 312, to the input to single-shot 325 and, through a conventional inverter 332 to one input to a two input NAND gate 334 also forming a part of the keyboard control 124. The other input to NAND gate 334 is connected to the output of single-shot 328, which output is connected in parallel to the other input to NAND gate 314 of keyboard decoder 120. The output of NAND gate 334 is provided via path 336 back to decoder 300 to provide a signal indication to decoder 300 to sample input lines.

The output of single-shot 324 of keyboard control 124 is preferably provided to the keyboard storage shift register 122 clear input. As shown and preferred in FIG. 8, keyboard storage shift register 122 is preferably a three stage-three digit shift register comprising stages 340, 342, and 344 which are connected together in conventional fashion. Preferably, shift register 340 contains the least significant digit of the three digits and shift register 344 contains the most significant digit of the three digits. The various terminals of the shift registers 340, 342 and 344 are labeled in conventional fashion to indicate shift-in (SI), reset (R), shift-out (S/), clock (CK), clear (CL), with the inputs being labeled A, B, C, and D, and the outputs being labeled $O_A$, $O_B$, $O_C$, $O_D$. The previously mentioned output of single-shot 324 of keyboard control 124 is connected in parallel to the clear inputs of stages 340, 342 and 344 of shift register 122 via path 350. Shift register 340, which represents the first stage of the keyboard storage shift register 122, has its inputs preferably connected in parallel to input lines 302, 304, 306 and 308, which lines 302, 304, 306 and 308 are, as previously mentioned, connected in parallel to the input to decoder 300. The clock inputs of the shift register stages 340, 342, and 344 are preferably connected in parallel via path 360 to a conventional digital clock generator 362, illustratively shown as being contained within the keyboard control 124 for purposes of explanation. As shown and preferred in FIG. 8, the last output terminal of the first stage 340 is conventionally connected to the reset terminal of stage 342 and the last output terminal of stage 342 is conventionally connected to the reset terminal of the last stage 334.

The frame request register 110 preferably comprises a three stage register comprising three conventional registers 370, 372 and 374 with one such register preferably being associated with only one stage of the keyboard storage shift register 122, register stage 370 being associated with shift register stage 340, register stage 372 being associated with shift register stage 342 and register stage 374 being associated with shift register stage 344. The parallel outputs of shift register stage 340 are preferably provided via paths 376, 378, 380 and 382 to the inputs of register stage 370, the parallel outputs 384, 386, 388, and 390 of shift register stage 342 are preferably provided to the input of register stage 372, and the parallel outputs 383, 394, 396 and 398 of shift register stage 344 are preferably provided to the input of shift register stage 374. The terminals of register stages 370, 372 and 374 are labeled in conventional fashion with the inputs and outputs being labeled as previously described with the addition of an UP up input terminal connected via path 320 to the MORE output of decoder 300, a DOWN input terminal of stage 370 being connected via path 322 to the BACK output of decoder 300, and with register stage 370 having a CARRY output terminal which is connected to the UP input terminal of register stage 372 and a BORROW output terminal which is connected to the DOWN input terminal of stage 372. Similarly, the CARRY output terminal of stage 372 is connected to the UP input terminal of stage 374 and the BORROW output terminal of stage 372 is connected to the DOWN input terminal of stage 374. In addition, each of the stages 370, 372 and 374 preferably has a load input terminal (L) which is connected in parallel to the keyboard control 124 and keyboard decoder 120 via call command path 318. The outputs of the register stages 370, 372 and 374 which are provided to the comparator 104 EXCLUSIVE OR gates 208 through 230, inclusive, respectively are labeled 1H, 2H, 4H, 8H, 11H, 12H, 14H, 18H, 21H, 22H, 24H, and 28H.

The keyboard control 124, as shown and preferred in FIG. 8, also includes a conventional counter 400 having a pair of input terminals 402 and 404, and three output terminals 406, 408 and 410. In addition, counter 400 preferably includes a reset terminal 412 which is connected via path 414 to the output of NAND gate 314 of keyboard decoder 120, the output of gate 314 being termed the DATA STROBE signal. The output of counter 400 is provided from terminal 406 via path 416 and is connected in parallel to the shify-in input terminal of shift register stage 340 and, through a conventional inverter 418 in parallel to the shiftout input terminals of shift register stages 342 and 344 of keyboard storage shift register 120. The conventional digital clock generator 362 previously mentioned preferably has its output connected to one input of a two input NAND gate 420 with the output of NAND gate 420 preferably being connected in parallel to one input of a three input OR gate 422, to the clock inputs of shift register stages 340, 342 and 344 via path 360, to one input of a three input NAND gate 424 and, through a conventional inverter 426, to input terminal 402 of counter 400. Output terminal 408 of counter 400 is preferably connected in parallel to another input of OR gate 422 and, through a conventional operational amplifier 420 to another input of NAND gate 424. Output terminal 410 of counter 400 is connected in parallel to the other input of OR gate 422 and to the other input of NAND gate 424 whose output is connected to input terminal 404 of counter 400.

Referring now to FIGS. 8 and 9, the operation of the keyboard logic 52 of the frame grabbing system 20 of the present invention shall be described. When a key is depressed on keyboard 50 to select a frame to be grabbed, a signal will be present on any of lines 302, 304, 306 or 308 depending on the numerical designation of the frame selected. It should be noted that each depression preferably represents one digit in the numerical designation of the frame to be selected so that the depression of a single key only indicates one digit of the frame designation. By way of example, line 302 represents digit one, line 304 represents digit 2, line 306 represents digit 4, and line 308 represents digit 8, any combination of these lines providing a digit from one through 9, input line 480 representing the digit 0. This input signal from keyboard 50 is provided to decoder 300 through NAND gate 310 if a signal is present on lines 306 and 308 or directly if a signal is present on lines 302 or 304. Input lines 302 and 304 preferably represent the first two bits of information which are preferably looked at for control information as will be described in greater detail hereinafter. When the signal is provided to decoder 300, output line 330 goes high, by way of example, indicating that a key has been depressed. This triggers single-shot 326 to preferably provide a short duration pulse, such as, by way of example, 1 to 2 milliseconds to introduce a delay of this duration for the sampling of the keyboard lines. This minimizes errors due to contact bounce. At the end of the provision of the single-shot pulse from multi-vibrator 326, single-shot 328 is triggered providing a sampling pulse or strobe to NAND gates 334 and 314. If output 330 is still high, which is the normal condition, by way of example, when a key has been depressed, during this sampling interval, the other output will be provided to NAND gate 334 through inverter 332 and, both inputs being present, NAND gate 334 will produce an output pulse which represents the signal SAMPLE INPUT LINES to decoder 300 via path 336 indicating to the decoder 300 to strobe the keyboard lines 302, 304, 306 and 308 into the decoder 300. After these inputs 302 through 308 have been strobed, all output lines of decoder 300 are preferably held constant. It should be noted that the keyboard lines 302 through 308, in the logic being illustrated by way of example, are preferably all held high by conventional pull-up resistors 500, 502, 504 and 506 and go low when the appropriate key has been depressed. Therefore, initially considering the condition when only control information is present from the keyboard 50 via the input lines 302 through 308, only lines 302 and 304, which are the first two digits, are preferably low, or, in other words, preferably when no output is present from NAND gate 310, decoder 300 will recognize the input information as control information. Accordingly, in the example shown, the control codes are 1100, 0100 or 1000 reading left to right from lines 302 through 308. In this condition, when only lines 302 or 304 are low, one of the inputs to OR gate 316 from decoder 300 which output represents the control information, is low and an output pulse is preferably provided from OR gate 316 to NOR gate 250 of capture logic 106 via path 116, this signal being the control key indication signal indicating that a control key has been depressed. This condition is true whether the control condition is CALL, MORE or BACK, as previously discussed. If the MORE command is the control key condition and a signal is provided via path 320 to the frame request register 110, this register 110 will be incremented by one count in conventional fashion. If the BACK command is the control key condition, a signal will be provided via path 322 to the frame request register 110 which will be decremented by one count in conventional fashion. If the CALL command is the control key condition, then a signal will be provided via path 318 to the load input of the FRAME request register 110 stages 370, 372 and 374 and when these stages 370, 372, and 374 will conventionally be parallel loaded from the contents of shift register stages 340, 342 and 344, respectively, of the keyboard storage shift register 122. In addition, single-shot 324 will preferably be triggered to produce a single-shot pulse which is provided in parallel to the clear terminals of shift register stages 340, 342 and 344 of the keyboard storage shift register 122. At the end of the single-shot pulse from multivibrator 324, shift register stages 340, 342 and 344 of the keyboard storage shift register 122 will be cleared. Multi-vibrator 324 preferably fires at the end of the single-shot pulse of multivibrator 328 after the decoder 300 has strobed the keyboard input lines.

It should be noted, that the logic convention chosen for purposes of the explanation of the operation of system 20 is that a zero indicates a high condition and one indicates a low condition.

When a data condition, that is a non-control condition is indicated from the keyboard 50 such as by the depressing of other than control keys, which condition is indicated by an output being present on lines 306 or 308 as opposed to an output only being present on lines 302 and 304, input lines 306 or 308 are low. Under this condition, an output is provided on all data lines from decoder 300 to NAND gate 312. NAND gate 312 then provides an output pulse to NAND gate 314 which receives its other input from single-shot 328 in the manner previously described above with respect to the provision of a sampling strobe output signal from multivibrator 328. This sampling strobe output signal is provided in the same manner as previously discussed with respect to the control indication conditions with respect to sampling the input lines in response to the provision of an output signal from NAND gate 334. Accordingly, when both inputs are present to NAND gate 314, that is a sampling strobe signal from single-shot multivibrator 328 and an output pulse from NAND gate 312 indicating there is an output on all data lines from decoder 300, a DATA STROBE pulse is provided from NAND gate 314 via path 414 to counter 400 to reset this counter 400. At the same time, if a key is still depressed, single-shot 328 also provides an input to NAND gate 334, as was previously mentioned, which receives the other input thereto via path 330 as described above to provide the sampling strobe pulse to decoder 300 via path 336.

When counter 400 is reset, all outputs therefrom via terminals 406, 408 and 410 are preferably low. Anyone of these outputs 406, 408 or 410 going low preferably causes a high output from OR gate 422 which provides a pulse to one input of NAND gate 420. The other input to NAND gate 420, as previously mentioned, is preferably provided from the continuously running conventional digital clock 362 such as preferably, by way of example, a 300 kilocycle clock generator with a 50 percent duty cycle. NAND gate 420 then provides an output pulse back to OR gate 422, which keeps NAND gate 420 open, as well as providing a clocking pulse to counter 400 through inverter 426 and to the clock input of the three stage keyboard storage shift register 122 via path 360, and also provides an input to NAND gate 424. Preferably, the function of the clock line output of NAND gate 420 is to synchronize the turning off of OR gate 422, the turning on of NAND gate 424, the output from counter 400 and the shifting of the keyboard storage shift register 122. Subsequent clock outputs from NAND gate 420 cause counter 340 to increment in conventional fashion and to cause shift register 122 to shift in conventional fashion. This condition preferably continues until the ocurrence of the fourth clock pulse. After the fourth clock pulse from NAND gate 420 has occurred, output line 409 is preferably low and output line 411 is high. Therefore, when the strobe line from NAND gate 420 to the input of NAND gate 424 is high, an output from NAND gate 424 is applied to input terminal 404 of counter 400. This preferably causes an output on line 416 from terminal 406 at the occurrence of the next clock pulse provided to input terminal 402 from NAND gate 420. Preferably when this occurs and output lines 416 goes high, this changes the function of the shift register stages 340, 342 and 344 of the keyboard storage shift register 122 so that the first digit or stage 340 of register 122 is put in a load condition with respect to the keyboard input lines 302, 304, 306 and 308. Inverter 418, at the same time, preferably inhibits the clocking of stages 342 and 344 which represent the second and third digits respectively, of shift register 122. The above sequence is repeated for each data key, causing a shift one decimal position, or one register state 340, to 342, to 344, and the loading of the least significant decimal until a call control key is depressed by the user indicating a control key condition. In this manner, the user does not have to enter leading zeros so that, by way of example, if the user wishes to select frame number 4 he merely presses the key (or keys) corresponding to the digit four and the control key marked call rather than having to depress three keys, assuming a three digit system indicating 004 to select the frame number 4. It should be noted that shift register 122 and frame request register 110 are preferably not binary counters but rather are decimal or base-10 counters which preferably obviates the need for a decimal-to-binary conversion after entry of the information via the keyboard 50.

Summarizing the operation of the frame grabbing system 20 of the present invention, the coding of the horizontal scan lines which indicates that new or updating information is to be supplied for a frame being grabbed or the location of a frame sync pulse so as to enable the counting of frames to insure that the proper frame is selected, is provided to the horizontal scan line information in conventional fashion by computer 30. The video generator 34 preferably creates a new frame of information at a predetermined rate, such as preferably one-sixieth of a second, from data contained in the mass memory 32 which information is supplied to the video generator 34 from the computer 30. The resulting signal can modulate RF and can be transmitted anyway a standard television signal can be transmitted and, accordingly, this is accomplished in conventional fashion. This signal is subsequently, received by the frame grabb logic 54 which compares the actual frame number with the frame number requested by the keyboard 50 and, if they agree, stores this information in the local memory 64 for continuous read out and video display. In selecting a frame to be grabbed, the user enters a keyboard request which can either be a number which is stored in the keyboard storage register of a control command such as CALL, MORE or BACK. The CALL command enters the contents of the keyboard storage register 122 into the frame request register 110 whereas the MORE and BACK commands increment and decrement, respectively, the frame request in register 110. The incomming video signal supplies the vertical and horizontal sync pulses as well as being available for storage on command from the capture logic 106. The frame sync pulse is preferably a burst of video energy on the seventeeth horizontal scan line, which scan line is normally blank and, together with the presence of a video signal, resets the frame counter 108 when it is detected by the frame label decoder 90. The frame sync pulse interval is preferably selected by conventionally programming computer 30 to select this interval based on the minimum update time desired and the maximum access time permissible, access time being defined as the time between the information request and the retrieval of this information and update time being defined as the time between the change of information and the provision of a new display of this information. The maximum count of frame counter 108 is preferably determined by the smallest desired maximum information retrieval time, with the counter 108 being reset in response to the detection of the frame sync pulse. If a new frame signal is decoded by the detection of the presence of a burst of video energy on the sixteenth horizontal scan line, such a signal preferably only being present when the information following is new, capture command is provided to the capture logic 106. The frame counter 108 is incremented by one for each frame following the occurrence of the frame sync pulse and when the frame counter 108 and frame request register 110 outputs match, a match signal is provided by the comparator 104 to the capture logic 106. If this is the first match occurring since the new key request has been made, then a command is sent to the local memory 64 until the next vertical sync. After the first match, no more commands are sent to the local memory 64 unless a new frame signal is decoded which coincides with the occurrence of a match signal. The provision of a capture command to the local memory 64 causes one frame to be stored, in conventional fashion, which is continuously read out, such as into a sync adder and therefrom to the video display device 42. In this manner a single frame of video information may be instantaneously selected in real time from continuously transmitted video information and such selected frame may be automatically updated as new information is provided in real time. Unless otherwise specified, all logic components are conventional and, if desired, any desired conventional logic convention may be utilized with appropriate conventional modifications to the logic.

It is to be understood that the above described embodiment of the invention is merely illustrative of the principles thereof and that numerous modifications and embodiments of the invention may be derived within the spirit and scope thereof.

What is claimed is:

1. A real time frame grabbing system for substantially instantaneously providing a continuous video display of a selectable predetermined video frame of information on a video display means from a plurality of different continuously transmittable frame of video information, each video frame containing associated horizontal and vertical sync signal information said system comprising means for retrievably storing said continuously transmitted frames; means operatively connected to said frame storage means for selectively encoding a predetermined horizontal scan line in a video frame after the vertical sync signal for said frame with a uniquely recognizable signal, said selective encoding means selectively encoding only a portion of said plurality of frames at a predetermined interval between encoded frames, said coding interval being dependent on at least a selected predetermined maximum access time for said video display of an individual selected predetermined video frame; means operatively connected to said frame encoding means and said frame storage means for providing said plurality of frames including said encoded plurality of video frames to said video display means; means operatively connected to said video display means for substantially instantaneously selecting a particular predetermined frame from said plurality of continuously transmitted frames; control means operatively connected between said frame selecting means and said video display means for controlling the provision of said continuously video displayable selected particular frame to said video display means for continuous video display thereof; said frame selection means comprising selectable input means operatively connected to said control means for providing a selection information output associated with said particular frame to said control means, said selection information output comprising a unique frame address for said particular frame; said control means comprising means operatively connected to receive said vertical sync information associated with said continuously transmitted frames, said vertical sync information comprising vertical sync pulse signals, said vertical sync information receiving means comprising means for sequentially counting said vertical sync pulses associated with said continuously transmitted frames to provide an output each of said outputs representing a unique frame address signal; comparator means operatively connected to said sequential counting means output and said selection information means output for comparing said frame address signal outputs, said comparator means providing an output signal when said selection information means frame address output and said sequential counting means output match; means operatively connected to receive said horizontal sync signal information and detect said uniquely recognizable signal, said detection means being further operatively connected to said counting means for resetting said counting means in response to said detection of said uniquely recognizable signal; and means operatively connected to said comparator means output for real time capturing said selected particular frame in response to said comparator output signal and providing said captured continuously video displayable selected particular frame to said video display means for continuous video display thereof.

2. A real time frame grabbing system in accordance with claim 1 wherein said horizontal sync signal information comprising horizontal sync pulse signals, and said selective encoding means comprises means operatively connected to said frame storage means for initially receiving said horizontal sync signal information and said vertical sync signal information for sequentially counting said horizontal sync pulses associated with said continuously transmitted frames, signal generation means operatively connected to said sequential counting means for providing said uniquely recognizable signal in response to a predetermined count of said horizontal sync signal sequential counting means said vertical sync signal resetting said counting means gating means operatively connected between said signal generation means output and said frame plurality providing means for receiving said horizontal sync signal information associated with each of said frames and said signal generation means output for providing said uniquely recognizable signal to said predetermined horizontal scan line of said portion of said plurality of frames in accordance with said coding interval.

3. A real time frame grabbing system in accordance with claim 1 wherein said system further comprises video signal generation means operatively connected between said selective encoding means and said frame storage means for providing said horizontal sync signal, vertical sync signal and video information to said encoding means and said video display means from said frame storage means.

4. A real time frame grabbing system in accordance with claim 1 wherein said selective encoding means comprises means for encoding a different predetermined horizontal scan line in a video frame after the vertical sync with another uniquely recognizable signal, said selective encoding means selectively encoding said different predetermined horizontal scan line only when said video information associated with a frame is real time updated, said predetermined horizontal scan line coding interval being further dependent on a selected predetermined minimum update time; said horizontal sync signal information detection means further comprising means for detecting said other uniquely recognizable signal and providing an output in response thereto, said other uniquely recognizable detection means output being operatively connected to said frame capture means, said frame capture means capturing said updated video frame information for said selected particular frame in response to said other uniquely recognizable detection means output for providing said captured updated continuously video displayable selected particular frame to said video display means.

5. A real time frame grabbing system in accordance with claim 4 wherein said horizontal sync signal information comprising horizontal sync pulse signals, and said selective encoding means comprises means operatively connected to said frame storage means for initially receiving said horizontal sync signal information and said vertical sync signal information for sequentially counting said horizontal sync pulses associated with said continuously transmitted frames, signal generation means operatively connected to said sequential counting means for providing said uniquely recognizable signal in response to a predetermined count of said horizontal sync signal sequential counting means, said vertical sync signal resetting said counting means, gating means operatively connected between said signal generator means output and said frame plurality providing means for receiving said horizontal sync signal information associated with each of said frames and said signal generation means output for providing said uniquely recognizable signal to said predetermined horizontal scan line of said portion of said plurality of frames in accordance with said coding interval.

6. A real time frame grabbing system in accordance with claim 5 wherein said signal generation means further provides said other uniquely recognizable signal in response to a different predetermined count of said horizontal sync signal sequential counting means, said gating means providing said other uniquely recognizable signal to said other predetermined horizontal scan line of said updated frame in accordance with said coding interval.

7. A real time frame grabbing system in accordance with claim 1 wherein said frame capture means comprises means operatively connected to said comparator means output for controlling the real time capture of said selected particular frame, and local memory means operatively connected between said frame capture control means and said video display means for real time capturing said selected particular frame and retrievably storing said captured frame for providing said captured continuously video displayable selected particular frame to said video display means for continuous video display thereof, said frame capture control means providing a capture signal to said local memory means in response to said comparator output signal, said local memory means capturing said frame in response to said capture signal.

8. A real time frame grabbing system in accordance with claim 7 wherein said selective encoding means comprises means for encoding a different predetermined horizontal scan line in a video frame after the vertical sync with another uniquely recognizable signal, said selective encoding means selectively encoding said different predetermined horizontal scan line only when said video information associated with a frame is real time updated, said predetermined horizontal scan line coding interval being further dependent on a selected predetermined minimum update time; said horizontal sync signal information detection means further comprising means for detecting said other uniquely recognizable signal and providing an output in response thereto, said other uniquely recognizable detection means output being operatively connected to said frame capture control means; said frame capture control means providing another capture signal to said local memory means in response to said other uniquely recognizable detection means output, said local memory means capturing said updated video frame information for said selected particular frame and retrievably storing said captured updated frame in response to said other capture signal for providing said updated continuously video displayable selected particular frame to said video display means.

9. A real time frame grabbing system in accordance with claim 8 wherein said horizontal sync signal information comprising horizontal sync pulse signals, and said selective encoding means comprises means operatively connected to said frame storage means for initially receiving said horizontal sync signal information and said vertical sync signal information for sequentially counting said horizontal sync pulses associated with said continuously transmitted frames, signal generation means operatively connected to said sequential counting means for providing said uniquely recognizable signal in response to a predetermined count of said horizontal sync signal sequential counting means, said vertical sync signal resetting said counting means, gating means operatively connected between said signal generator means output and said frame plurality providing means for receiving said horizontal sync signal information associated with each of said frames and said signal generation means output for providing said uniquely recognizable signal to said predetermined horizontal scan line of said portion of said plurality of frames in accordance with said coding interval.

10. A real time frame grabbing system in accordance with claim 9 wherein said signal generation means further provides said other uniquely recognizable signal in response to a different predetermined count of said horizontal sync signal sequential counting means, said gating means providing said other uniquely recognizable signal to said other predetermined horizontal scan line of said updated frame in accordance with said coding interval.

11. A real time frame grabbing system in accordance with claim 1 wherein said control means further comprises means for retrievably storing said selection information at least until said selection information is changed, said selection information storage means output being operatively connected to said comparator means for providing said frame address output thereto.

12. A real time frame grabbing system in accordance with claim 11 wherein said frame selection input means comprises means for providing control information and frame address information associated with said particular frame to said control means, said frame address information being provided to said selection information storage means, said control means further comprising selected frame address storage means operatively connected between said comparator means and said selection information storage means, and condition responsive means operatively connected between said selected frame address storage means and said selection input means for providing a load output signal to said selected frame address storage means in response to a unique control information signal from said selection input means, said selected frame address storage means loading the frame address information thereinto from said selection information storage means in response to said load output signal and retrievably storing said loaded frame address information at least until said selection information is changed, said loaded frame address information comprising said frame address output to said comparator means.

13. A real time frame grabbing system in accordance with claim 12 wherein said selected frame address storage means is a storage register means and said condition responsive means further provides an increment signal to said selected frame address storage register means in response to a different unique information signal from said selection input means, said selected frame address storage register incrementing to retrievably store a different frame address in response to said increment signal, said different frame address being provided to said comparator means.

14. A real time frame grabbing system in accordance with claim 12 wherein said selected frame address storage means is a storage register means and said condition responsive means further provides a decrement signal to said selected frame address storage register means in response to another different unique control information signal from said selection input means, said selected frame address storage register decrementing to retrievably store another different frame address in response to said decrement signal said other different frame address being provided to said comparator means.

15. A real time frame grabbing system in accordance with claim 12 wherein said selection information storage means and said selected frame address storage means are decimal counters.

16. A real time frame grabbing system in accordance with claim 12 wherein said selection information storage means is a shift register means and said slected frame address storage means is a storage register means, said selection input means being a digital keyboard input means for providing said frame address information to said shift register means one digit at a time, said shift register means segregating said frame address input into at least a least significant digit and a most significant digit, said digits being loaded in parallel into said storage register means.

* * * * *